(12) United States Patent
Izukawa

(10) Patent No.: US 6,400,907 B1
(45) Date of Patent: Jun. 4, 2002

(54) CAMERA AND CAMERA SYSTEM FOR SELECTIVELY SUPPLYING VARIABLE POWER TO ACCESSORY MOUNTED ON CAMERA MAIN BODY BASED ON COMMUNICATION BETWEEN CAMERA AND ACCESSORY

(75) Inventor: Kazuhiro Izukawa, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 4 days.

(21) Appl. No.: 09/709,725

(22) Filed: Nov. 13, 2000

(30) Foreign Application Priority Data

Nov. 18, 1999 (JP) .......................................... 11-327607

(51) Int. Cl.$^7$ ................................................ G03B 7/26
(52) U.S. Cl. ..................................................... 396/301
(58) Field of Search ................................ 396/301, 302, 396/303, 529; 348/372

(56) References Cited

U.S. PATENT DOCUMENTS 5,389,998 A * 2/1995 Dunsmore et al. ...... 396/301 X
5,479,056 A * 12/1995 Manbuchi ............... 396/301 X
6,128,443 A * 10/2000 Higuma .................. 396/529 X

FOREIGN PATENT DOCUMENTS

JP          2546220        8/1996  ............ G02B/7/28

* cited by examiner

Primary Examiner—W. B. Perkey
(74) Attorney, Agent, or Firm—Fitzpatrick, Cella, Harper & Scinto

(57) ABSTRACT

A camera system is composed of an accessory and a camera main body, where the accessory can be mounted on the camera main body, communication is performed between the accessory and the camera main body, and the accessory is supplied with power from the camera main body; the camera main body can supply power having a plurality of different voltages to the accessory, performs communication between the camera main body and the accessory, determines the voltage of the power suitable for the accessory from power supply voltage information of the accessory obtained by communication between the camera main body and the accessory and supplies the power to the accessory, whereby the voltage of the power to be supplied from the camera main body to the accessory can be correctly and promptly determined for each accessory even if there are alternative accessories which require either two types of voltages or three or more types of voltages.

19 Claims, 6 Drawing Sheets

CAMERA AND CAMERA SYSTEM FOR SELECTIVELY SUPPLYING VARIABLE POWER TO ACCESSORY MOUNTED ON CAMERA MAIN BODY BASED ON COMMUNICATION BETWEEN CAMERA AND ACCESSORY

BACKGROUND OF THE INVENTION

1. Field of the Invention

The present invention relates to an improved camera system including a camera main body and an accessory mountable on the camera main body, wherein the camera main body can perform communication between the camera main body and the accessory and can supply power to the accessory.

2. Description of the Related Art

In a camera system composed of a camera main body and an accessory mountable on the camera main body, the accessory has been arranged heretofore such that it is operated by power supplied from the camera main body. Japanese Patent Publication No. 2546220, for example, discloses a camera system in which camera size is reduced, the number of parts is decreased, and cost is lowered by using a common power supply terminal, and by making it unnecessary to increase the number of terminals even if different types of AF lenses are mounted thereon.

In this type of camera system, the power supply voltage which can be used by the accessory is determined from the state of a contact between a camera main body and the accessory. The voltage is determined based on whether or not a response is returned from the accessory to the camera main body when a signal is supplied to the accessory from the camera main body. Therefore, only two types of voltages can be determined, which is not suitable for determining a voltage which can be used by an interchangeable lens mounted on the camera main body accurately and promptly, when there are many interchangeable lenses which are operated at different voltages.

SUMMARY OF THE INVENTION

One aspect of this invention relates to a camera system composed of an accessory and a camera main body. The accessory can be mounted on the camera main body and includes a communication unit for performing communication between the accessory and the camera main body. The camera main body includes a power supply unit capable of supplying power having a plurality of different voltages (e.g., voltage levels) to the accessory and a communication unit for performing communication between the camera main body and the accessory; the camera main body determines the voltage of the power to be supplied to the accessory based on a result of communication with the accessory. This invention thus relates to a camera system capable of correctly and promptly supplying power from the camera main body to the accessory even if the system uses a plurality of accessories which require either two types of power supply voltages or three or more types of power supply voltages.

One aspect of this invention relates to a camera system composed of a camera main body and an accessory, where the accessory is mountable on the camera main body and has a communication unit through which communication is performed between the accessory and the camera main body and a CPU, the power consumption of which is reduced when a voltage higher than a voltage necessary for normal operation thereof is supplied thereto, and where the camera main body includes a communication unit for performing communication between the camera main body and the accessory. When the accessory is in a waiting state, the camera main body supplies power, a voltage of which is higher than a voltage with which the CPU of the accessory performs normal operation, to the accessory so that the power consumption of the CPU of the accessory is reduced. This invention thus provides a camera system in which power consumption of the accessory is reduced when the accessory is in the waiting state.

One aspect of this invention relates to a camera which includes a communication unit for performing communication with an accessory mounted on the camera and a power supply unit for supplying power having a plurality of different voltages (e.g., voltage levels) to the accessory and determines the voltage of the power to be supplied to the accessory based on a result of communication with the accessory. This invention relates to a camera capable of correctly and promptly supplying power to an accessory even where the camera is usable with a plurality of accessories which require either two types of power supply voltages or three or more types of power supply voltages.

One aspect of this invention relates to a camera composed of a communication unit through which communication is performed with an accessory mounted on the camera and a power supply unit for supplying power to the accessory. When the accessory is in a waiting state, the power supply unit supplies power, a voltage of which is higher than a voltage with which the accessory performs normal operation, to the accessory so that the power consumption of the accessory is reduced. This invention thus relates to a camera in which power consumption of the accessory is reduced when it is in the waiting state.

Further objects, features and advantages of the present invention will become apparent from the following description of the preferred embodiments with reference to the attached drawings.

DESCRIPTION OF THE PREFERRED EMBODIMENTS

The present invention will be described below in detail based on illustrated embodiments.

Figure 1:
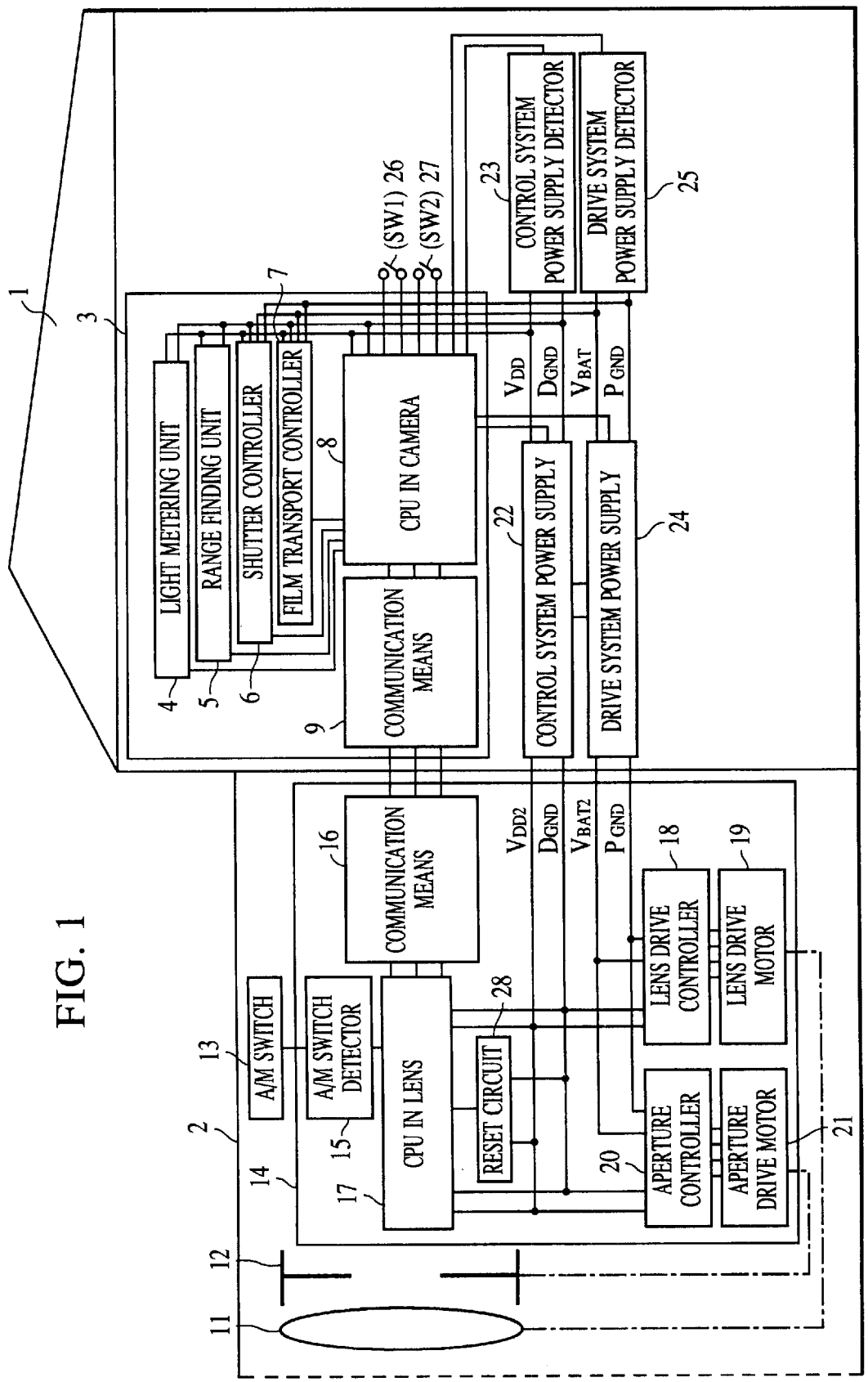
FIG. 1 is a block diagram showing an electric arrangement of a camera and a camera system according to respective embodiments of the present invention.

FIG. 1 is a block diagram schematically illustrating an electric arrangement of a camera system, which is composed of a camera main body and an interchangeable lens as an accessory, which can perform communication with each other, according to respective embodiments of the present invention.

In FIG. 1, reference numeral 1 denotes the camera main body and reference numeral 2 denotes an interchangeable lens as an accessory mountable on the camera main body.

An electric circuit unit 3 in the camera main body 1 includes a light metering unit 4 for metering a quantity of light having passed though the interchangeable lens 2, a range finding unit (or a focus detector) 5 for measuring a distance from the surface of a film to a subject, a shutter controller 6 for exposing the film for an appropriate time, a film transport controller 7 of a film charge system for winding and rewinding the film, a CPU (in camera) 8 for controlling the above units and the interior of the camera main body 1, and communication means 9 for performing serial communication with interchangeable lens 2 (the accessory).

Further, in the interchangeable lens 2, reference numeral 11 denotes a focusing lens in the interchangeable lens 2, reference numeral 12 denotes an aperture, and reference numeral 14 denotes an electric circuit unit in the interchangeable lens 2.

The electric circuit unit 14 includes an A/M switch detector 15 for detecting a state of an A/M switch 13 for switching between auto focusing and manual focusing, communication means 16 for performing communication with the camera main body 1, a CPU (in lens) 17 for controlling the internal of the interchangeable lens 2, a lens drive controller 18 for controlling the drive of the focusing lens 11, a lens drive motor 19 for driving the focusing lens 11, an aperture controller 20 for controlling the drive of an aperture, an aperture drive motor 21 for driving the aperture, and a reset circuit 28 for resetting the CPU (in lens) 17 by detecting a power supply voltage.

Further, in the camera main body 1, reference numeral 22 denotes a control system power supply for supplying VDD to the light metering unit 4, the range finding unit 5, the CPU (in camera) 8 and the like and VDD2 to the CPU (in lens) 17 and the like in accordance with an instruction from the CPU (in camera) 8. ** Note that VDD and VDD2 are control system power supply supplies for supplying power to a control system circuit which consumes a relatively small amount of power and requires a stable output voltage. Further, VDD2 has a variable voltage.

Reference numeral 23 denotes a control system power supply detector for detecting the voltage and power of the control system power supply 22. Reference numeral 24 denotes a drive system power supply for supplying VBAT to the shutter controller 6 and the film transport controller 7, and supplying VBAT2 to the lens drive controller 18, the aperture controller 20 and the like in accordance with an instruction from the CPU (in camera) 8. Note that VBAT and VBAT2 are drive system power supplies for supplying power to a drive system circuit which consumes a relatively large amount of power. Reference numeral 25 denotes a drive system power supply detector for detecting the voltage and power of the control system power supply 24. Reference numeral 26 (SW1) denotes a switch for starting an operation of the light metering unit 4, and reference numeral 27 (SW2) denotes a switch for starting an operation of the range finding unit 5 and an open/close operation of a shutter.
(First Embodiment)

Figure 2:
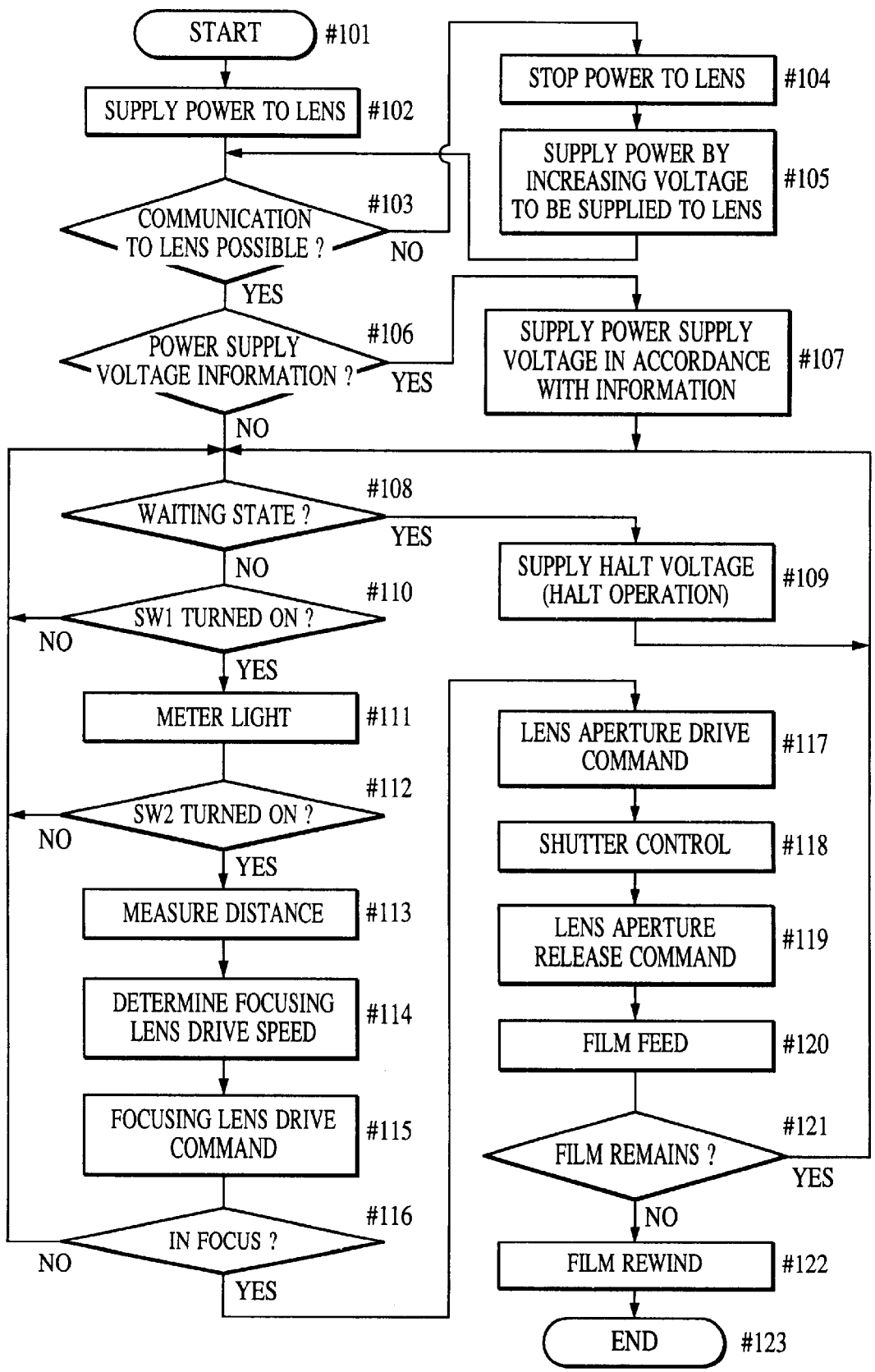
FIG. 2 is a flowchart showing the operation of a camera main body in a first embodiment of the present invention.
Figure 3:
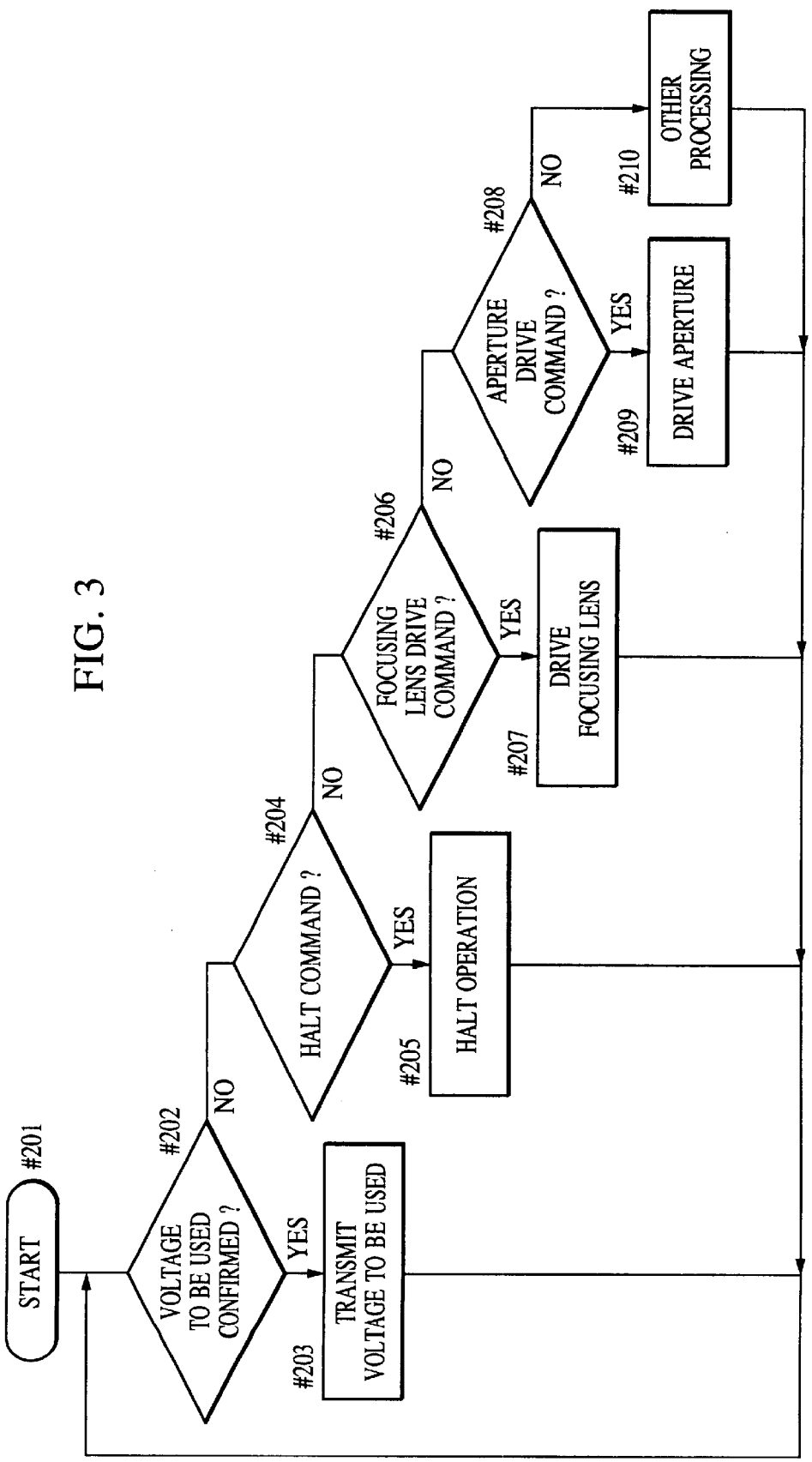
FIG. 3 is a flowchart showing the operation of an interchangeable lens in the first embodiment of the present invention.

FIGS. 2 and 3 are flowcharts showing the operations according to a first embodiment of the present invention. More specifically, FIG. 2 is a flowchart showing the operation of the camera main body 1 shown in FIG. 1, and FIG. 3 shows the operation of the interchangeable lens 2 shown in FIG. 1.

When a power supply switch (not shown) is turned ON, the CPU (in camera) 8 starts operation from step #101. First, at step #102, a predetermined voltage $VDD2_0$ is supplied from the control system power supply 22 to the CPU (in lens) 17 as VDD2. Then, at next step #103, the CPU (in camera) 8 performs communication with the CPU (in lens) 17 through communication means 9 and 16 and confirms whether or not proper communication is possible. This is determined based on, for example, whether or not a predetermined content of communication could be transmitted and received. As a result, when it is determined that proper communication can be performed therebetween, the process goes to step #106, whereas when it is determined that proper communication cannot be performed, the process goes to step #104.

When the process goes to step #104, the control system power supply 22 stops supplying VDD2 to the CPU (in lens) 17. This operation is carried out to prevent a malfunction of the CPU (in lens) 17 by stopping the power supplied thereto, because if a voltage other than that by which the CPU (in lens) 17 is properly operated is supplied thereto, there is a possibility that a malfunction of the CPU (in lens) 17 may occur. Further, when power is supplied the next time, the reset circuit 28 is operated to reset the CPU (in lens) 17. Note that, in this case, either a VDD2 terminal may be short circuited to a DGND terminal or a VDD2 of 0 V may be supplied to the CPU (in lens) 17. Furthermore, a negative voltage within a peak inverse voltage may be supplied to the CPU (in lens) 17. This operation permits the voltage of the CPU (in lens) 17 to be made equal to a voltage near to 0 V more promptly than an operation in which the supply of the voltage VDD2 to the CPU (in lens) 17 is stopped.

At next step #105, after the CPU (in camera) 8 confirms that the voltage VDD2 has been reduced or after a predetermined period of time has passed, the CPU (in camera) 8 causes the control system power supply 22 to supply a voltage, which has a predetermined voltage value higher than the voltage supplied at step #103 (previous time) to the CPU (in lens) 17 as VDD2. Note that the voltage VDD2 is increased to a higher voltage value each time steps from #103 to #105 are executed again (repeated). Thereafter, the process returns to step #103 and the communication confirmation step is performed again (repeated).

When it is confirmed at step #103 that proper communication can be performed, and the process goes to step #106, at which step it is confirmed whether or not information as to the power supply voltage of the interchangeable lens 2 is available through communication with the lens. When this information is available, the process goes to step #107, at which step a voltage which satisfies the information as to the power supply voltage is supplied to the CPU (in lens) 17 as VDD2. Whereas, when the power supply voltage information is not available, it is determined that the interchangeable lens is a lens having an old specification. Thus, a voltage satisfying the specification of the lens is supplied to the CPU (in lens) 17 as VDD2. In each ease, the supply of VDD2 may be stopped if necessary as shown at step #104.

At next step #108, the CPU (in camera) 8 detects whether or not a waiting state is established in a predetermined period of time after a switch is set or operated. When the waiting state is established, the process goes to step #109, at which step a low power consumption state (halt mode) is set to suppress the consumption of power. That is, when the CPU (in lens) 17 is in the waiting state, a halt voltage is supplied as VDD2 to reduce power consumption. The halt voltage is higher than a normal voltage with which the CPU (in lens) 17 is operated. The CPU (in the lens) 17 has a circuit constructed such that when a voltage higher than the normal voltage is applied to the CPU (in lens) 17, current consumed thereby is reduced and power consumption is reduced accordingly. However, the voltage used in operation may be supplied as it is. Whereas, when the waiting state is not established, a voltage VDD2 set at aforesaid step #105 or #107 is supplied to the CPU (in lens) 17.

At step #110, the CPU (in camera) 8 determines whether or not the switch SW1 is turned ON, and when it is turned ON, the process goes to step #111, at which step the CPU (in camera) 8 determines a shutter speed and an aperture value from the output from the light metering unit 4 and from the f number of the mounted interchangeable lens 2. Then, at next step #112, the above operations are repeated until the switch SW2 is turned ON, and when it is turned ON, the process goes to step #113.

At step #113, the CPU (in camera) 8 determines the amount of movement of the focusing lens 11 of the mounted interchangeable lens 2 from the output of the range finding unit (or focus detector) 5 and the optical information of the mounted interchangeable lens 2 and supplies the amount of movement to the interchangeable lens 2. Then, at next step #114, the CPU (in camera) 8 determines the maximum speed of movement of the focusing lens 11 from the output of the range finding unit 5 and the optical information of the mounted interchangeable lens 2 and supplies the maximum speed of movement to the interchangeable lens 2. At subsequent step #115, the CPU (in camera) 8 supplies a command to the interchangeable lens 2 to start movement of the focusing lens 11 within the amount of movement of the focusing lens 11 set at step #113 and within the maximum speed of movement thereof set at step #114.

At next step #116, the CPU (in camera) 8 confirms whether or not the focusing lens 11 of the mounted interchangeable lens 2 is at an in-focus position from the output of the range finding unit 5 and the optical information of the mounted interchangeable lens 2. When the focusing lens 11 is at the in-focus position, the process goes to step #117; when the focusing lens 11 is not at the in-focus position, the process returns to step #108 and performs the respective light metering and focusing (or focus detecting) operations again.

When the process goes to step #117, the CPU (in camera) 8 supplies a command to the interchangeable lens 2 to drive the aperture 12 up to the aperture value determined at step #111, and at next step #118 the CPU (in camera) 8 causes the shutter controller 6 to open and close the shutter at the shutter speed determined at step #111. At subsequent step #119, the CPU (in camera) 8 supplies a command to the interchangeable lens 2 to drive the aperture 12 until the aperture 12 is opened, and at next step #120, causes the film transport controller 7 to feed a film (not shown) by one frame. At next step #121, the CPU (in camera) 8 determines whether or not some frames (frames on which pictures can be exposed/photographed) remain in the film, and when no unexposed frame remains, the process goes to step #122, at which step the film is rewound by the film transport controller 7 and this series of the operations is completed at step #123. Further, when some unexposed frames remain in the film, the process returns to step #108 and the same operations are repeated.

Next, operation of the interchangeable lens 2, which receives commands from the camera main body 1 through communication as described above, will be described using the flowchart of FIG. 3.

When the CPU (in lens) 17 in the interchangeable lens 2 is reset by the reset circuit 28 or receives a command from the camera main body 1 through communication, the CPU (in lens) 17 starts operation at step #201 and analyzes the commands from the camera main body 1 at step #202 and subsequent steps.

First, at step #202, the CPU (in lens) 17 determines whether or not a command from the camera main body 1 is the command at step #106, that is, whether or not the command is an instruction to confirm a power supply voltage which is usable by the CPU (in lens) 17. When the determination is "YES", the process goes to step #203, at which step a usable power supply voltage is transmitted to the CPU (in camera) 8. Upon completion of the above operation, the process returns to step #202.

Further, when it is determined that the command to the interchangeable lens 2 is not an instruction to confirm the power supply voltage usable by the CPU (in lens) 17, the process goes to step #204, at which step it is determined whether or not the command is an instruction to set the interchangeable lens 2 in a low power consumption state (halt mode). When the determination is "YES", the process goes to step #205, at which step the power consumption of the lens drive controller 18, the aperture controller 20 and the like is stopped so as to keep the CPU (in lens) 17 in the low power consumption state, thereby setting the interchangeable lens 2 in the low power consumption state (halt mode). Upon completion of the above operation, the process returns to step #202.

Further, when it is determined at step #204 that the command is not an instruction to set the interchangeable lens 2 in the lower power consumption state (halt mode), the process goes to step #206, at which step it is determined whether or not the command is an instruction for driving a focusing lens 11, and when the determination is "YES", the process goes to step #207, at which step the focusing lens 11 is driven in response to the command from the camera main body 1 which instructs the amount of movement and the moving direction of the focusing lens 11. Upon completion of the above operation, the process returns to step #202.

Further, when it is determined at step #206 that the command is not an instruction for driving the focusing lens 11, the process goes to step #208, at which step it is determined whether or not the command is an instruction for driving the aperture 12, and when the determination is "YES", the process goes to step #209, at which step the aperture 12 is driven in response to the command from the camera main body 1 which instructs the amount of stop down and the stop down direction of the aperture 12. Upon completion of the above operation, the process returns to step #202.

Further, when it is determined at step #208 that the command is not an instruction for driving the aperture 12, the process goes to step #210, at which step when it is determined that the command is an other command, for example, a command for requesting optical information, the CPU (in lens) 17 executes the command, e.g., transmits the optical information to the camera main body 1. Then, the process returns to step #202.

(Second Embodiment)

Figure 4:
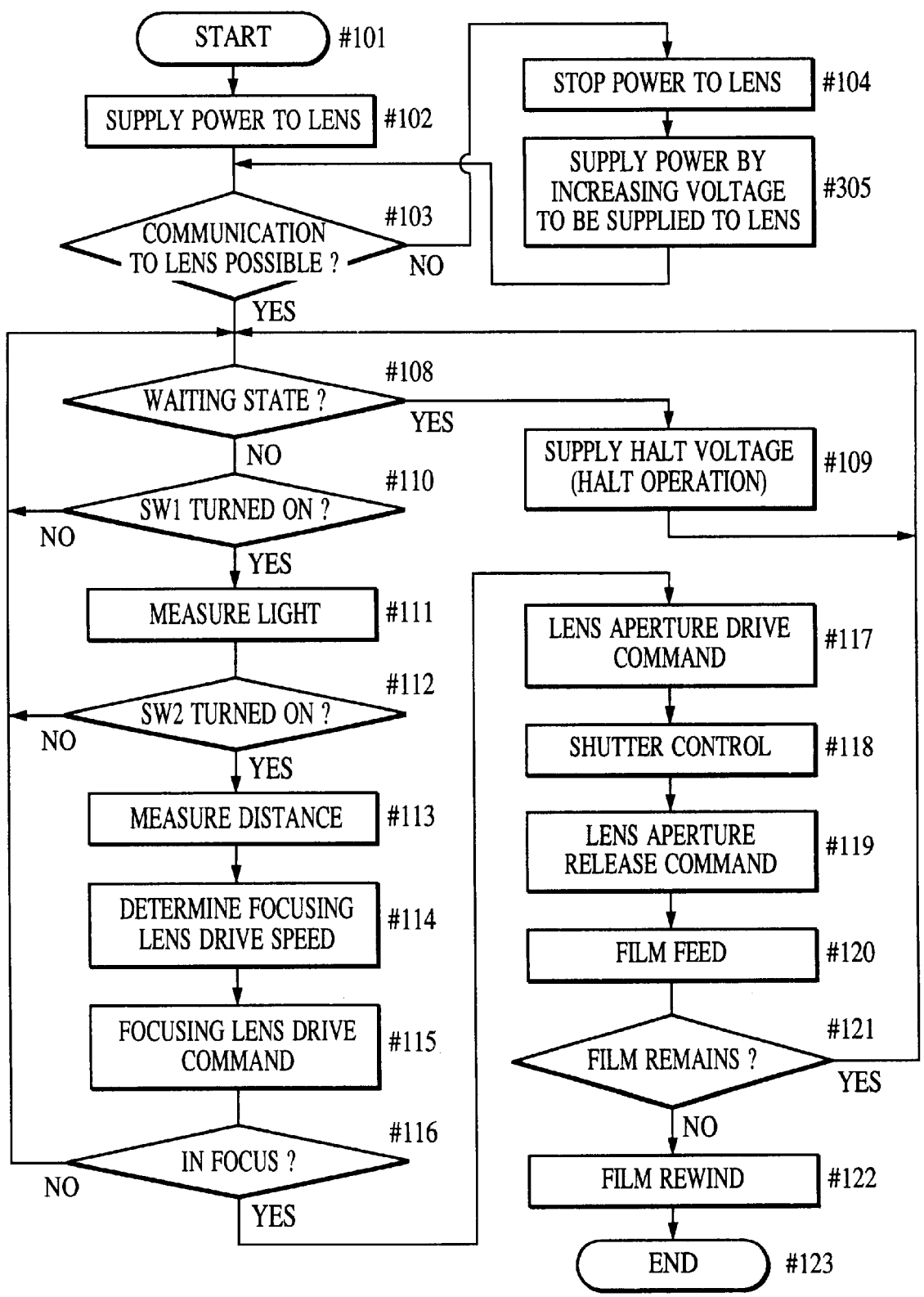
FIG. 4 is a flowchart showing the operation of the camera main body in a second embodiment of the present invention.
Figure 5:
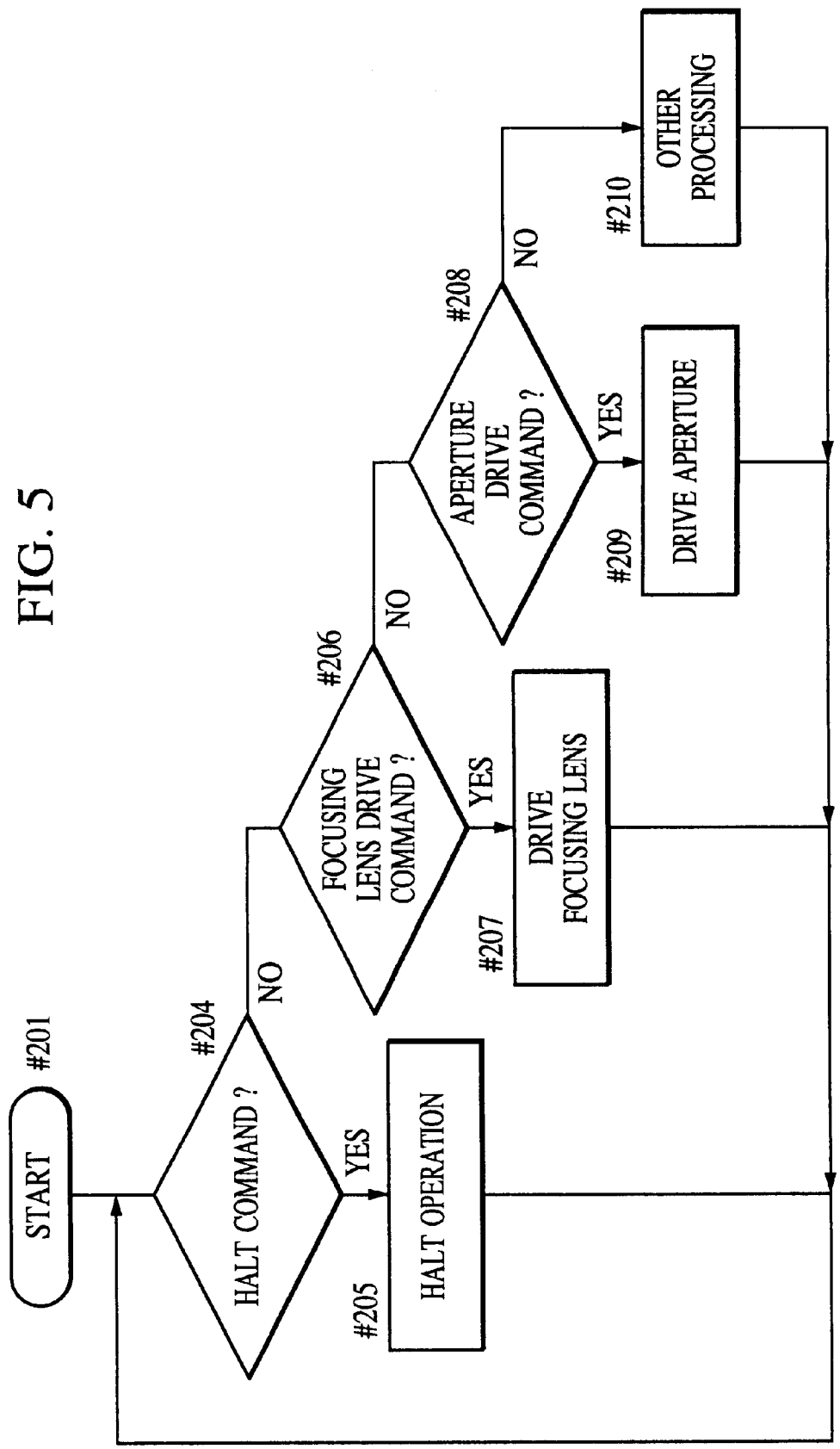
FIG. 5 is a flowchart showing the operation of the interchangeable lens in the second embodiment of the present invention.

FIGS. 4 and 5 are flowcharts showing the operations of the camera main body 1 and the interchangeable lens 2, which are shown in FIG. 1, according to a second embodiment of the present invention. The flowcharts shown FIGS. 4 and 5 correspond to those shown in FIGS. 2 and 3 in the first embodiment. In FIGS. 4 and 5, steps in which the same operations as those in FIGS. 2 and 3 are carried out are denoted by the same step numbers.

FIG. 4 is different from FIG. 2 in that steps #106 and #107 in FIG. 2 are deleted and step #305 is added in place of step #105 in FIG. 2.

In FIG. 4, a plurality of voltages, by which the lens can be operated, are predetermined, and a voltage having a determined value is supplied to the CPU (in lens) 17 as VDD2 at step #305. With this operation, the number of determinations at step 1103 can be reduced as described in the first embodiment, which permits a prompt operation.

Further, FIG. 5 is different from FIG. 3 in that steps #202 and #203 in FIG. 3 are deleted.

It should be noted that it is when there is no information as to the power supply voltage of the lens at step #106 of FIG. 2 that it is determined an interchangeable lens for executing the operation of FIG. 5 is mounted on the camera main body. Accordingly, it can be determined that the interchangeable lens of FIG. 5 is a lens having an old specification. Thus, a voltage which satisfies the specification is supplied to the CPU (in lens) 17 as VDD2.

(Third Embodiment)

Figure 6:
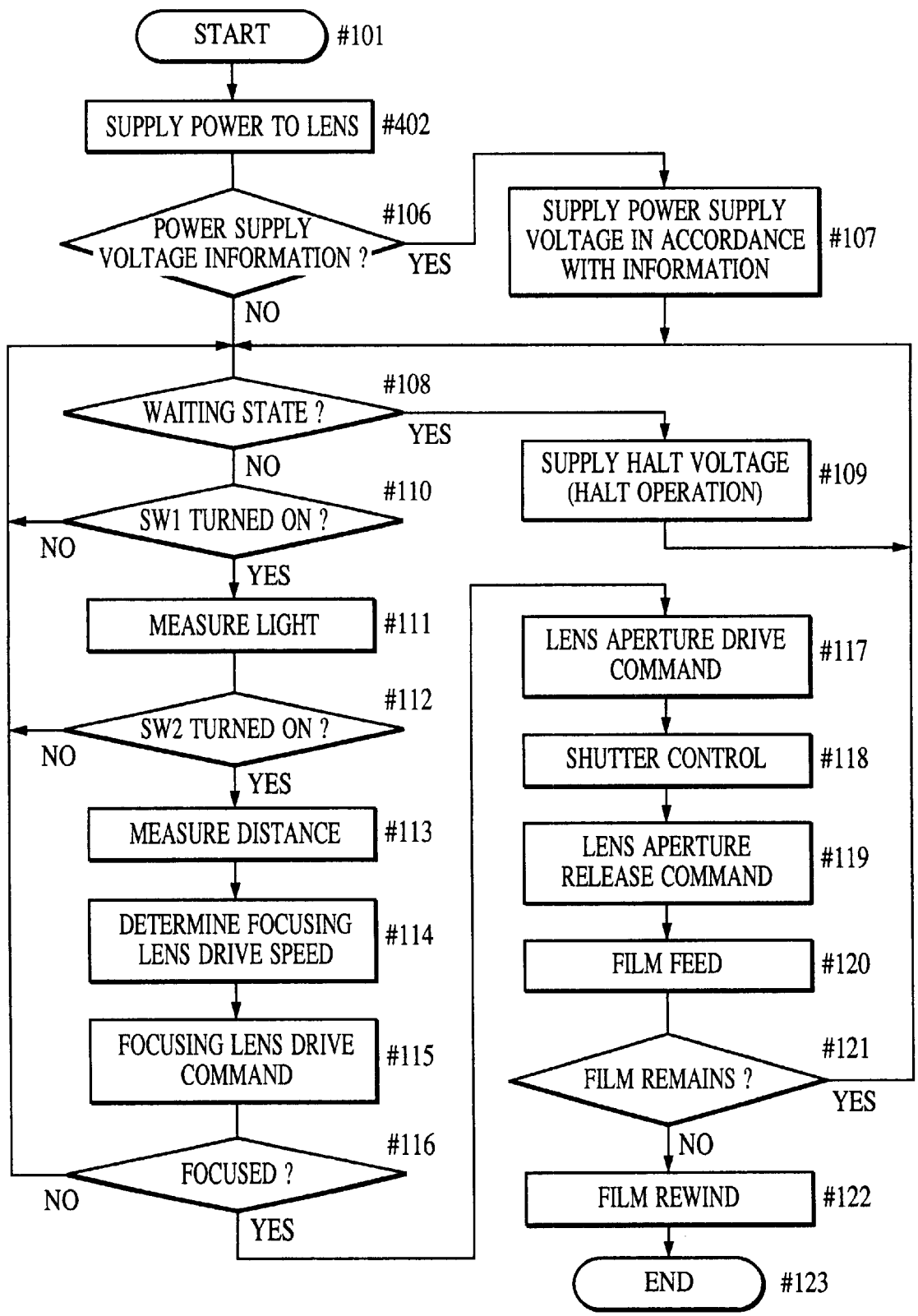
FIG. 6 is a flowchart showing operation of the camera main body in a third embodiment of the present invention.

FIG. 6 is a flowchart showing the operation of the camera main body 1, which is shown in FIG. 1, according to a third embodiment of the present invention. The flowchart shown in FIG. 6 corresponds to that shown in FIG. 2 in the first embodiment. In FIG. 6, steps in which the same operations as those in FIG. 2 are carried out are denoted by the same step numbers.

FIG. 6 is different from FIG. 2 in that steps #103 and #105 in FIG. 2 are deleted and step #402 is added in place of step #102.

In the third embodiment, in contrast to the first embodiment, communication can be carried out with interchangeable lens 2 using voltages which can be supplied to all interchangeable lenses.

In FIG. 6, a predetermined voltage, by which the interchangeable lens 2 can be operated, is supplied from the control system power supply 22 to the CPU (in lens) 17 as VDD2 at step #402. Thereafter, a voltage which satisfies information as to the power supply voltage of the interchangeable lens 2 is supplied to the CPU (in lens) 17 as VDD2.

According to the above embodiments, there can be obtained the following effects.

1) The information as to the power supply voltage which can be used by the interchangeable lens 2 is transmitted from the interchangeable lens 2 to the camera main body 1 and a voltage used by an interchangeable lens 2 mounted to the camera main body 1 is determined by the thus transmitted information. Accordingly, it is possible to correctly and promptly determine a voltage which is to be used by an interchangeable lens 2 mounted to the camera main body 1, even if interchangeable lenses which use different voltages may be used in alternative combinations (steps #102, #107 and the like in FIG. 2), which permits the camera system to perform an effective operation.

Specifically, a voltage having a predetermined voltage value is supplied to the interchangeable lens 2 and communication is carried out with the interchangeable lens 2 in this state; when communication cannot be carried out, a power supply voltage which can be used by the interchangeable lens 2 is confirmed by supplying a voltage having a value higher than the previous value, thereby determining a voltage which can be used by the interchangeable lens 2. Therefore, it is possible to adapt the camera to use plural alternative accessories which use either two types of power supplies or three or more types of power supplies.

2) When the interchangeable lens 2 is set in the halt mode (low power consumption state), a voltage which causes the interchangeable lens 2 to consume a small amount of current is supplied thereto, which permits power to be consumed in a smaller amount (step #109 in FIG. 2 and the like).

It should be noted that while an interchangeable lens is exemplified as the accessory in the above embodiments, the present invention is not limited thereto and can be applied to any accessory in the same way so long as it is used by being mounted on a camera.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A camera system comprising:

a camera main body including a communication unit and a power supply unit that selectively supplies power having a plurality of different voltages; and an accessory, including a communication unit, and mountable on said camera main body so as to receive power from said power supply unit of said camera main body and to communicate with said communication unit of said camera main body, wherein, when said accessory is mounted on said camera main body, said camera main body supplies power having a first predetermined voltage from said power supply unit of said camera main body to said accessory and determines whether normal communication is performed between said communication unit of said accessory and said communication unit of said camera main body, and when said camera main body determines that normal communication is not performed, said camera main body increases the voltage of the power to be supplied from said power supply unit to said accessory and again supplies power from said power supply unit to said accessory.

2. A camera system according to claim 1, wherein when said camera main body determines that a normal communication is performed, said camera main body then determines whether said accessory contains power supply voltage information indicating a voltage of a normal operation power of said accessory, and when said camera main body determines that said accessory contains power supply voltage information, said camera main body receives the power supply voltage information from said accessory and supplies power having a voltage based on the power supply voltage information from said power supply unit to said accessory.

3. A camera system according to claim 1, wherein when said camera main body determines that a normal communication is performed, said camera main body determines whether said accessory contains power supply voltage information indicating a voltage of a normal operation power of said accessory, and when said camera main body determines that said accessory does not contain power supply voltage information, said camera main body supplies power having a second predetermined voltage from said power supply unit to said accessory.

4. A camera system according to claim 1, wherein when said camera main body determines that a normal communication is not performed, said camera main body increases a voltage of the power to be supplied from said power supply unit to said accessory to a predetermined voltage value.

5. A camera system according to claim 1, wherein said accessory is an interchangeable lens.

6. A camera system comprising:

a camera main body including a communication unit and a power supply unit that selectively supplies power having a plurality of different predetermined voltages;

an accessory, including a communication unit, and mountable on a camera main body so as to receive power supplied by said power supply unit of said camera main body and to communicate with said communication unit of said camera main body, wherein, when said accessory is mounted on said camera main body, said camera main body supplies power having a first predetermined voltage from said power supply unit of said camera main body to said accessory and determines whether normal communication is performed between said communication unit of said accessory and said communication unit of said camera main body, and when said camera main body determines that normal communication is not performed, said camera main body increases a voltage of the power to be supplied from said power supply unit to said accessory to a next predetermined voltage and again supplies power from said power supply unit to said accessory.

7. A camera system comprising:

a camera main body, including a communication unit and a power supply unit that selectively supplies power having a variable voltage; and an accessory, including a CPU and a communication unit, and mountable on said camera main body so as to receive power from said power supply unit of said camera main body and to communicate with said communication unit of said camera main body, where a power consumption of said CPU of said accessory is reduced when a voltage higher than a voltage necessary for normal operation of said CPU is supplied thereto, and wherein, when said accessory is mounted on said camera main body, said camera main body communicates with said accessory via respective communication units and determines whether said accessory is in a waiting state, and when said camera main body determines that said accessory is in a waiting state, said camera main body supplies power having a voltage that is higher than the voltage necessary for normal operation of said CPU of said accessory.

8. A camera system comprising:

a camera main body, including a communication unit, and a power supply unit that selectively supplies power having a variable voltage; and an accessory, including a CPU and a communication unit, and mountable on said camera main body so as to receive power from said power supply unit of said camera main body and to communicate with said communication unit of said camera main body, where a current consumption of said CPU of said accessory is reduced when a voltage higher than a voltage necessary for normal operation of said CPU is supplied thereto, wherein, when said accessory is mounted on said camera main body, said camera main body communicates with said accessory via respective communication units and determines whether said accessory is in a waiting state, and when said camera main body determines that said accessory is in a waiting state, said camera main body supplies power having a voltage that is higher than the voltage necessary for normal operation of said CPU of said accessory.

9. A camera comprising:

a communication unit;

a mount adapted to receive an external accessory having a communication unit;

a power supply unit that selectively supplies power having a plurality of different voltages to an external accessory mounted on said mount of said camera; and a power supply voltage controller that controls the voltage of power supplied by said power supply unit, wherein, when an external accessory is mounted on said mount of said camera, said power supply unit supplies power having a first predetermined voltage to the accessory, said camera performs a communication operation with the accessory via respective communication units, and said power supply voltage controller controls the voltage of power to be supplied to the accessory based on a result of the communication operation.

10. A camera according to claim 9, wherein said camera determines whether the communication operation is a normal communication operation, and when said camera determines that the communication operation is a normal communication operation, said power supply voltage controller increases the voltage of the power supplied by said power supply unit to the accessory.

11. A camera according to claim 9, wherein said camera determines whether the communication operation is a normal communication operation, and when said camera determines that the communication operation is a normal communication operation, said camera determines whether the accessory contains power supply voltage information indicating a voltage of a normal operation power of the accessory, and when said camera determines that the accessory contains power supply voltage information, said power supply voltage controller receives the power supply voltage information from the accessory and determines a voltage of power to be supplied to the accessory based on the power supply voltage information.

12. A camera according to claim 9, wherein, said camera determines whether the communication operation is a normal communication operation, and when said camera determines that the communication operation is a normal communication operation, said camera determines whether the accessory contains power supply voltage information indicating a voltage of a normal operation power of the accessory, and when said camera determines that the accessory does not contain power supply voltage information, said power supply voltage controller sets a voltage of the power to be supplied to the accessory at a second predetermined voltage.

13. A camera according to claim 10, wherein, when said camera determines that the communication operation is not a normal communication operation, said power supply voltage controller increases a voltage of the power to be supplied to the accessory to a predetermined voltage value.

14. A camera according to claim 9, wherein the external accessory is an interchangeable lens.

15. A camera comprising:

a communication unit;

a mount adapted to receive an external accessory having a communication unit;

a power supply unit that selectively supplies power having a plurality of different predetermined voltages to an external accessory mounted on said mount; and a power supply voltage controller that controls the voltage of power supplied by said power supply unit, wherein, when an external accessory is mounted on said mount, said power supply unit supplies a first predetermined voltage to the accessory, said camera performs a communication operation with the accessory through respective communication units and determines whether the communication operation is a normal communication operation, and when said camera determines that the communication operation is not a normal communication operation, said power supply voltage controller increases a voltage of the power supplied by said power supply unit to a next predetermined voltage.

16. A camera comprising:

a communication unit;

a mount adapted to receive an external accessory having a communication unit; and a power supply unit that supplies power having a variable voltage to an external accessory mounted on said mount, wherein, when an external accessory is mounted on said mount, said camera performs a communication operation with the accessory through respective communication units and determines whether the accessory is in a waiting state, and when the camera determines that the accessory is in a waiting state, said power supply unit supplies power having a voltage that is higher than a voltage necessary to perform normal operation of the accessory, whereby a power consumption of the accessory is reduced.

17. A camera comprising a communication unit;

a mount adapted to receive an external accessory having a communication unit; and a power supply unit that selectively supplies power having a variable voltage to an external accessory mounted on said mount, wherein, when an external accessory is mounted on said mount, said camera performs a communication operation with said accessory through respective communication units and determines whether the accessory is in a waiting state, and when said camera determines that the accessory is in a waiting state, said power supply unit supplies power having a voltage that is higher than a voltage necessary for normal operation of the accessory, whereby a current consumption of the accessory is reduced.

18. An accessory mountable on a camera main body so as to receive power supplied from the camera main body, said accessory comprising:

a communication unit through which communication is performed with the camera main body; and a CPU, a power consumption of which is reduced when a voltage higher than a voltage necessary for normal operation of said CPU is applied thereto.

19. An accessory mountable on a camera main body so as to receive power supplied from the camera main body, comprising:

a communication unit through which communication is performed with the camera main body; and a CPU, a current consumption of which is reduced when a voltage higher than a voltage necessary for normal operation of said CPU is applied thereto.

* * * * *

UNITED STATES PATENT AND TRADEMARK OFFICE
CERTIFICATE OF CORRECTION

PATENT NO. : 6,400,907 B1
DATED : June 4, 2002
INVENTOR(S) : Kazuhiro Izukawa

It is certified that error appears in the above-identified patent and that said Letters Patent is hereby corrected as shown below:

Column 3,
Line 39, "supply" should be deleted.

Column 6,
Line 60, "shown" should read -- shown in --.

Signed and Sealed this

Nineteenth Day of November, 2002

Attest:

JAMES E. ROGAN
Attesting Officer          Director of the United States Patent and Trademark Office